United States Patent
Fukao (10) Patent No.: US 7,417,770 B2
(45) Date of Patent: Aug. 26, 2008

(54) IMAGE FORMING DEVICE WITH PRIORITY MODE TO FORCE AUTOMATIC SWITCHING TO MONOCHROMATIC MODE OVER COLOR MODE

(75) Inventor: Osami Fukao, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 519 days.

(21) Appl. No.: 11/164,089

(22) Filed: Nov. 10, 2005

(65) Prior Publication Data

US 2006/0238781 A1 Oct. 26, 2006

(30) Foreign Application Priority Data

Nov. 10, 2004 (JP) ............... 2004-326486

(51) Int. Cl.
*H04N 1/387* (2006.01)
*H04N 1/23* (2006.01)
*H04N 1/50* (2006.01)

(52) U.S. Cl. .................. 358/2.1; 358/3.24; 358/501

(58) Field of Classification Search .............. 358/1.9, 358/2.1, 3.24, 501, 530, 401, 443, 448, 468, 358/296; 399/82, 85
See application file for complete search history.

(56) References Cited

U.S. PATENT DOCUMENTS 5,884,120 A * 3/1999 Ito et al. ................. 399/54

2004/0095594 A1 * 5/2004 Moro ................. 358/1.13

FOREIGN PATENT DOCUMENTS

JP 09/138608 A 5/1997
JP 2003215984 A * 7/2003

* cited by examiner

*Primary Examiner*—Scott A Rogers
(74) *Attorney, Agent, or Firm*—Global IP Counselors, LLP (57) ABSTRACT

An image forming device is disclosed which can positively conserve expensive consumable products such as toner and ink or the like and which can provide copied material which conforms to the intent of the user by using a simple operation. The image forming device includes an original document attribute detection unit that detects whether an original document to be copied is color or monochrome, an automatic mode switching unit that automatically switches between a color mode which forms a color image and a monochrome mode which forms a monochrome image based on the original document attribute detected by the original document attribute detection unit, and an image forming unit which copies an original document image to recording paper using the mode switched to by the automatic mode switching unit, and provides a priority mode switching unit which gives priority to switching by the automatic mode switching unit and forcibly switches to the monochrome mode.

4 Claims, 11 Drawing Sheets

IMAGE FORMING DEVICE WITH PRIORITY MODE TO FORCE AUTOMATIC SWITCHING TO MONOCHROMATIC MODE OVER COLOR MODE

BACKGROUND OF THE INVENTION

1. Field of the Invention

The present invention relates to an image forming device which comprises an original document attribute detection means which detects whether an original document to be copied is color or monochrome, an automatic mode switching means which automatically switches between a color mode which forms a color image and a monochrome mode which forms a monochrome image based on the original document attribute detected by the original document attribute detection means, and an image forming means which copies an original document image to recording paper using the mode switched to by the automatic mode switching means.

2. Background Information

In order to efficiently use various high-cost consumable products, an image forming device such as a color copy or a color printer has been proposed which provides an original document attribute detection means which detects whether the original document to be copied is color or monochrome, and an automatic mode switching means for automatically switching between a color mode for forming color images, or a monochrome mode for forming monochrome images, based on the original document attributes detected by the original document attributes detection means.

An example of this type of device is an image forming device which has an original document determining mode for determining whether each of the original documents to be copied are color original documents or monochrome original documents, and an N in 1 copy mode for aggregate copying N sheets ($\geq 2$) of original document images onto a single sheet of recording paper. This image forming device also has a color/monochrome switching control means, which determines whether to output multiple copy images in color or in monochrome when the original document determining mode and the N in 1 copy mode are simultaneously selected when color original documents and monochrome original documents are mixed in the N sheets of the original document. See, for example, Japanese Patent Application Publication No. H09-138608.

In order to reduce the complexity of switching between color mode and monochrome mode for each original document, the aforementioned conventional image forming device determines whether to output the copy image in color or monochrome, and automatically switches based on the color ratio of a predetermined original document group. Therefore, not only is the bothersome operation of presetting the color ratio of the original document group required, but depending on the setup, the output of the copied material may not necessarily conform to the intent of the user.

Furthermore, when important documents are to be copied, a single sheet of the original document is usually copied onto a single sheet of recording paper rather than the situation in aggregate copy mode, where multiple sheets of original documents are copied onto a single sheet of recording paper. Furthermore, selecting the color mode when copying in this aggregate copy mode is not economical. These problems remain even when copying to the back side of recording paper which has already been used on one side.

With the foregoing in view, the present invention provides an image forming device which can positively conserve expensive consumable products such as toner and ink, and using a simple operation, can provide copied material which conforms to the intent of the user.

SUMMARY OF THE INVENTION

According to a first aspect of the present invention, an image forming device comprises an original document attribute detection means which detects whether an original document to be copied is color or monochrome, an automatic mode switching means which automatically switches between a color mode which forms a color image, and a monochrome mode which forms a monochrome image, based on the original document attribute detected by the original document attribute detection means, an image forming means which copies an original document image to recording paper using the mode switched to by the automatic mode switching means, and a priority mode switching means which gives priority to the switching by the automatic mode switching means and forcibly switches to monochrome mode.

With the aforementioned construction, the mode is automatically switched by the automatic mode switching means to color mode for color original documents and to monochrome mode for monochrome original documents, based on the original document attributes detected by the original document attributes detection means, and therefore a complex operation is not required. Furthermore, switching to the monochrome mode is given priority by the priority mode switching means, so copied materials can likewise be economically obtained without a complex operation.

According to a second aspect of the present invention, the image forming device of the first aspect further comprises a priority mode switch setting means which is preset to accept or reject forcible switching by the priority mode switching means.

With the aforementioned construction, the operation of the priority mode switching means which can be preset by the priority mode switching means is accepted or rejected, and therefore, if preset based on the operating environment of the image forming device, the copied material desired by the user can efficiently be obtained without unneeded operations.

According to a third aspect of the present invention, the image forming device of the first or second aspects further comprises a manual mode switching means which manually selects either the color mode or the monochrome mode regardless of the mode set by the automatic mode switching means or the priority mode switching means.

With the aforementioned construction, regardless of the mode automatically selected, the mode can be changed to the mode required by the user by operating the manual mode switching means, and therefore copied materials conforming to the intent of the user can be obtained by an extremely simple operation even under special circumstances which differ from normal.

According to a fourth aspect of the present invention, the priority mode switching means of any of the first to third aspects comprises a reused paper selection means or an aggregate copy mode selection means.

With the aforementioned construction, when reused paper is set in the device for copying onto the back side of recording paper which has already been used on one side, or when in the aggregate copy mode, the frequency of outputting important copied materials can be determined to be low, and therefore needless color copying can be restricted by giving priority to switching to the less-expensive monochrome mode rather than the more expensive color mode.

As described above, with the present invention, an image forming device can be provided which can control needless color output by forcibly switching to a monochrome mode if output by the monochrome mode is determined to be more appropriate even though the image output mode is set to the color mode.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
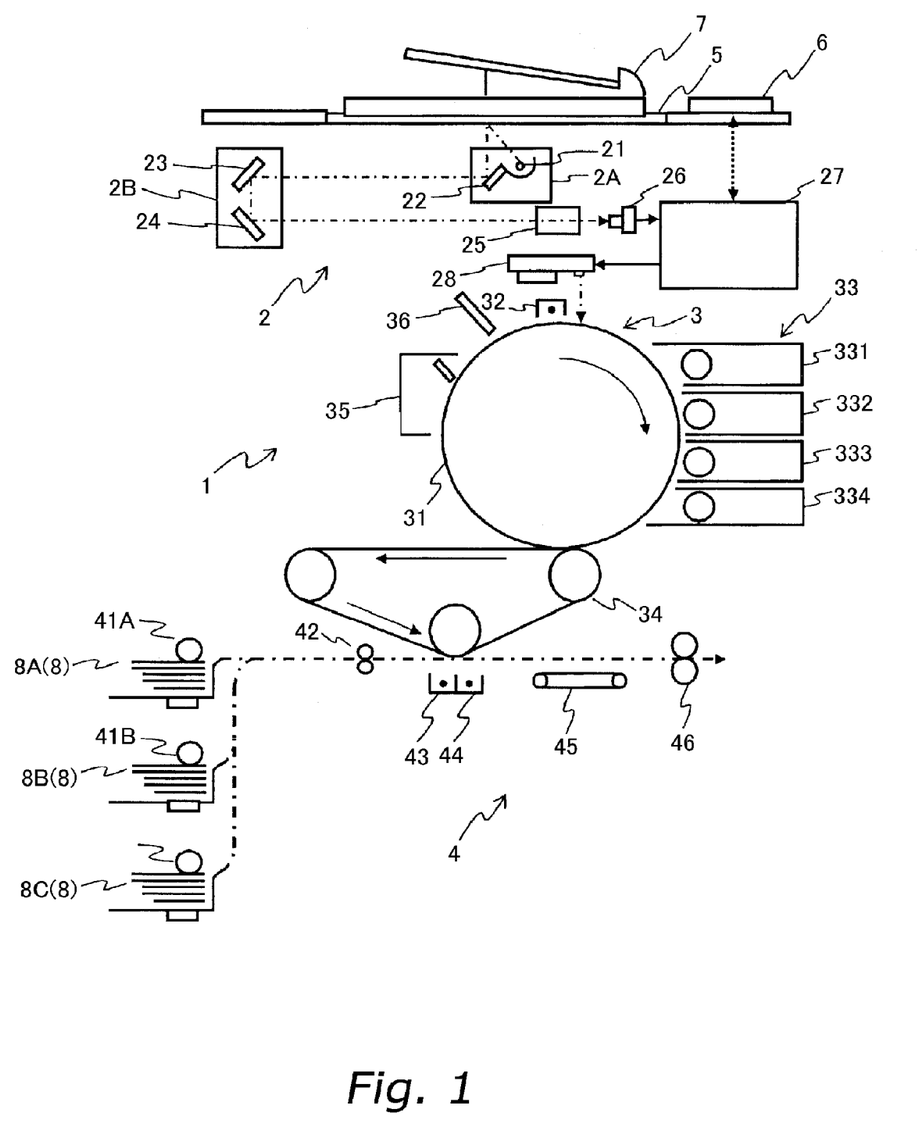
FIG. 1 is an explanatory diagram showing a summary of the image forming device.

An example of a multi-functional digital copier will be described below as an embodiment of the image forming device of the present invention. As shown in FIG. 1, the digital copier is constructed with a main body comprising an exposing mechanism 2 as the image reading means which reads the original document image information, a print mechanism 3 as the image forming means, and a paper feeder mechanism 4. An operating display unit 6 and a contact glass 5, onto which the original document to be copied is placed, are located on the top of main body, and a paper supply cassette 8 is located on one side of the main body.

The exposing mechanism 2 is comprising a first slider 2A with an exposure lamp 21 for exposure scanning an original document placed on the contact glass 5 and a first mirror 22 which reflects light reflected from the original document, a second slider 2B with a second and third mirror 23, 24 for guiding light reflected by the first mirror 22 to a lens 25, a fixed imaging element 26 such as a CCD for converting optical information obtained by a light collecting lens 25 to an electronic signal, a control unit 27 into which image information or the like obtained from the fixed imaging element 26 is input, and a laser unit 28 which converts the image data from the control unit 27 to an optical signal.

The print mechanism 3 provides a photosensitive drum 31 which is driven to rotate in the direction of the arrow by a main drive mode are not shown in the drawing. A charging unit 32, developing device 33, a copy belt 34, a cleaning device 35, and a static eliminator 36 are located in the area around the photosensitive drum 31 along the direction of rotation, and the developing device 33 has 4 developing units, namely a cyan developing unit 331, a magenta developing unit 332, a yellow developing unit 333, and a black developing unit 334.

Laser light corresponding to the developing colors output from the laser unit 28 is radiated onto the surface of the photosensitive drum 31 which has been uniformly charged by the charging unit 32 in order to form an electrostatic latent image. The developing device 33 creates a toner image from this static electric latent image, and this toner image is copied to the copy belt 34. Toner images for each of the four developing colors are formed so that a full-color toner image is copied and formed onto the copy belt 34. The toner remaining on the photosensitive drum 31 is removed by the cleaning device 37, and the electrical charge of the surface of the photosensitive drum 31 is removed by the static eliminator 38 in preparation for the next process.

The paper feeder mechanism 4 comprises paper feeder rollers 41A, 41B, 41C which feed copy paper from paper feeder cassettes 8A, 8B, 8C established on three vertical levels, a resist roller 42 for transporting copy paper transported by the paper feeder rollers 41A, 41B, 41C to the copy belt 34 at predetermined timing, a copy charger 43 which copies a full-color or monochrome toner image from the copy belt 34, a separation charger 44 which separates the copy paper from the copy belt 34, and a transport belt 35 which transports the copy paper, onto which the toner image has been copied, to a fixing roller 46. The copy paper which has been fixed by the fixing roller 46 is discharged to a discharge tray by a discharge mechanism not shown in the drawings.

Figure 2:
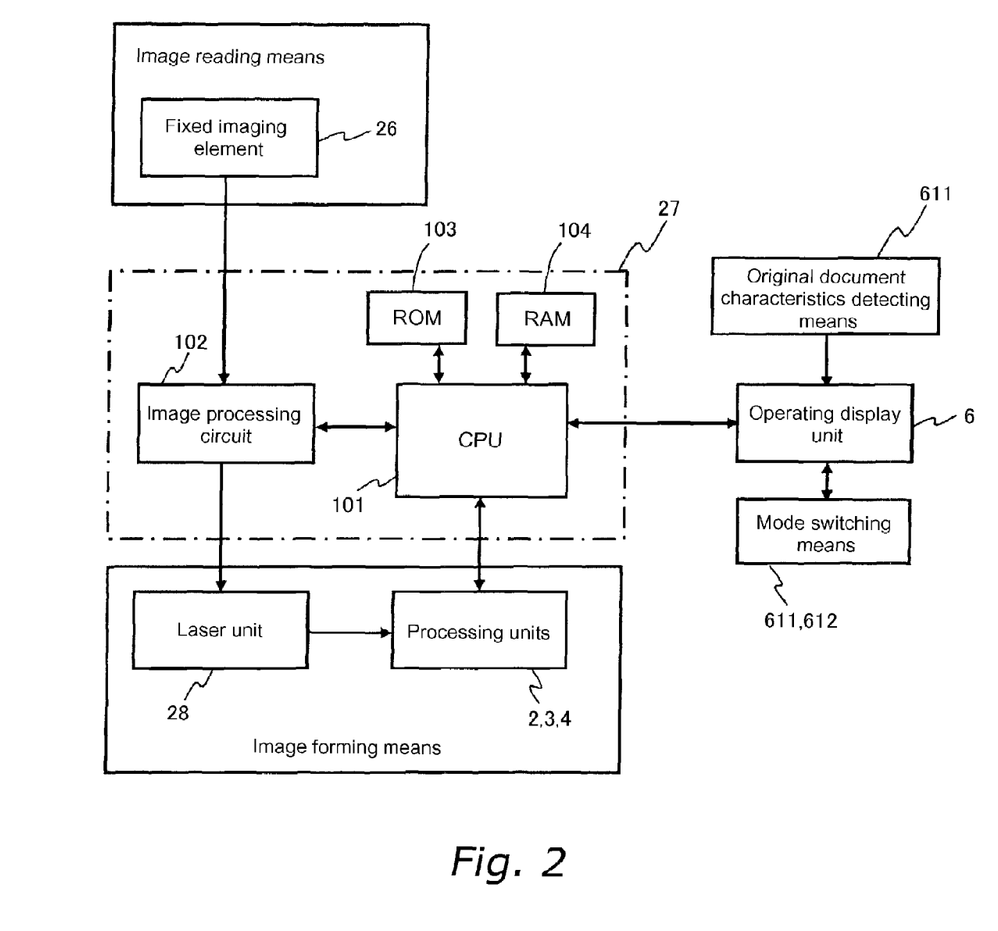
FIG. 2 is a control block diagram of the image forming device.

As shown in FIG. 2, the control unit 27 is comprising a CPU 101 which controls the operation of the digital copier 1, ROM 103 onto which a control program is recorded for the aforementioned exposing mechanism 2, a print mechanism 3, a paper feeder mechanism 4, and an operating display unit 6 or the like, RAM 104 as image recording means which records data necessary for processing by the CPU 101 and which also records the image information read by the image reading means, and an image processing circuit 102 which reads the image information recorded in the image recording means, performs predetermined image processing, and generates the image information output to the laser unit 28.

The image data generated by the image processing circuit 102 is temporarily stored in RAM 104, and then read at the predetermined timing and sent to the laser unit 28. The CPU 101 drives each of the elements of the processing unit, comprising the exposing mechanism 2, the print mechanism 3, and the paper feeder mechanism 4, and is constructed so that the image information sent to the laser unit 28 will be printed and output onto the copy paper.

Figure 4:
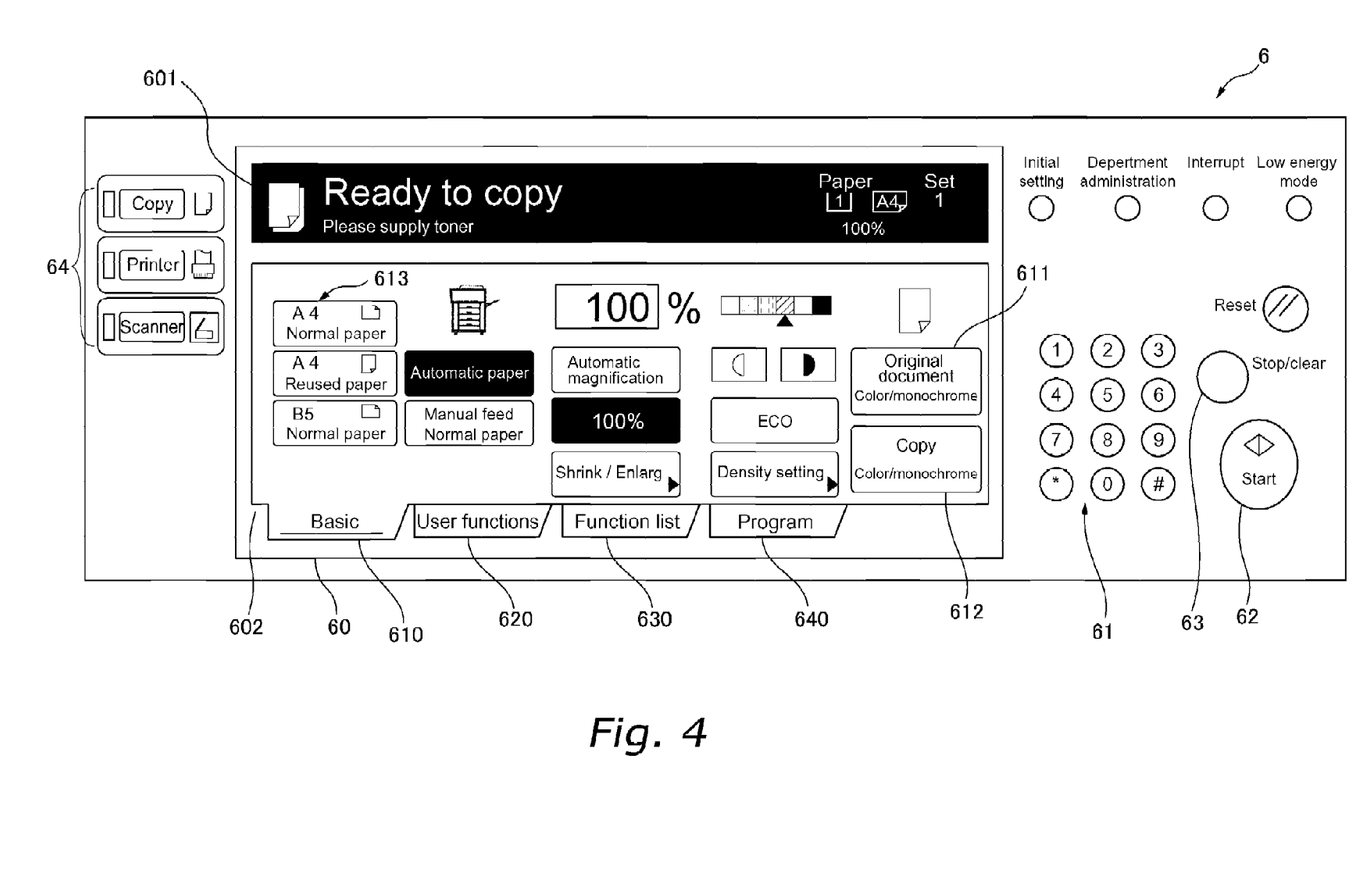
FIG. 4 is an explanatory diagram of the operating unit.

FIG. 4 shows an operating display unit 6 which has a touch panel type liquid crystal display 60 in the center region for performing the printing setup operation. Basic operating control keys such as numeric input keys 61 which set the number of copies, start key 62, and stop/clear key 63 or the like are located on the right hand side, and on the left-hand side is a display unit 64 for selecting and displaying the operating mode, namely a copy mode for outputting an image read from an original document onto copy paper, a printer mode for printing data output from a computer or the like onto copy paper, and a scanner mode for reading original document information and outputting to a network.

Figure 3:
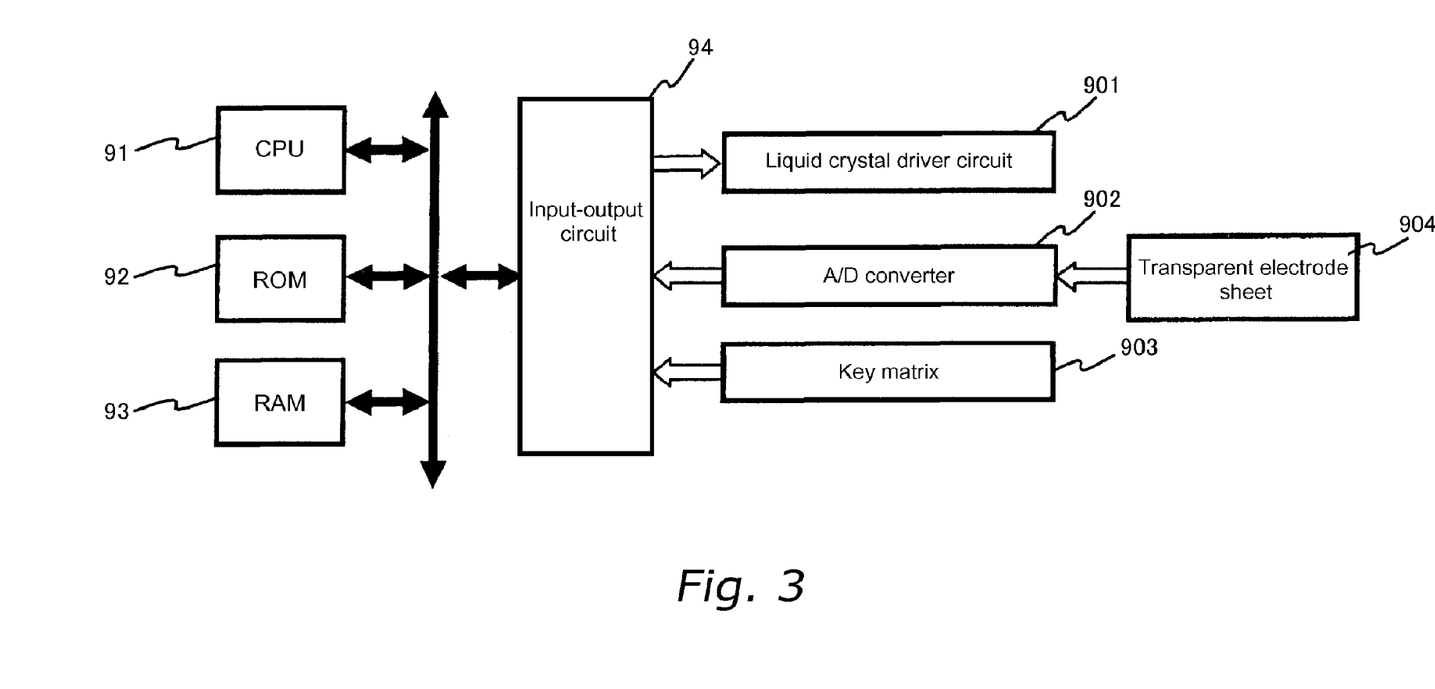
FIG. 3 is a block diagram of the display control device of the operating unit.

As shown in FIG. 3, the display control device performs input/output control for the operating display unit 6, and comprises a CPU 91 which transmits the various copy modes which are set for the CPU which is established in the aforementioned control unit, ROM 92 which stores a program which is executed by the CPU 91, RAM 93 which is used as the working area, a driver circuit 901 which is connected between the input-output circuit 94 and an internal bus and which drives the liquid crystal display unit 60 in the input-output circuit 94, A/D converter 902 for detecting the pressing position of a transparent electrode sheet 904, and a key matrix input circuit 903 which receives the input from the various keys.

As shown in FIG. 4, the liquid crystal display unit 60 displays a message display field 601 at the top. The bottom region is used for a mode setting key field 602, and this mode setting key field 602 is comprising a basic mode setting tab 610 which sets the basic conditions for copying such as the copy paper size, copy paper type, and zoom ratio or the like, a user function 602 which can individually set details of the basic mode, a function list tab 630 which can set the detailed operating modes for the copier, and a program tab 640 which can be used by the user to set customized copy modes or the like. The construction of the liquid crystal display unit 60 allows detection of the location of pressing when the transparent electrode sheet established on the surface of the liquid crystal display unit 60 is pressed.

The basic mode setting tab 610 has an original document selecting key 611 which functions as an original document attribute detection means to detect whether the original document to be copied is a color image or a monochrome image, and a mode switching key 612 which functions as a manual mode switching means for manually selecting either the color mode or the monochrome mode. In order to easily determine, by using one's senses, whether the color mode or the monochrome mode has been selected, the basic mode setting tab 610 is constructed such that an RGB color back light will light up when executing in color mode, and a monochrome gray-scale back light will light up when executing in monochrome mode. The copy paper selecting key 613 which selects the size and type of copy paper on which to output the image is constructed so that the size and type of copy paper set in each of the paper feeder cassettes 8A, 8B, 8C is displayed and the image will be output on the selected copy paper. If reused paper is selected in order to use the back surface of copy paper which has already been copied on one side, color output of the image will be determined to be unnecessary, and the copy paper selecting key 613 will function as the priority mode switching means for forcibly switching to monochrome mode and the output will be as if the original document was a monochrome image.

Figure 5A:
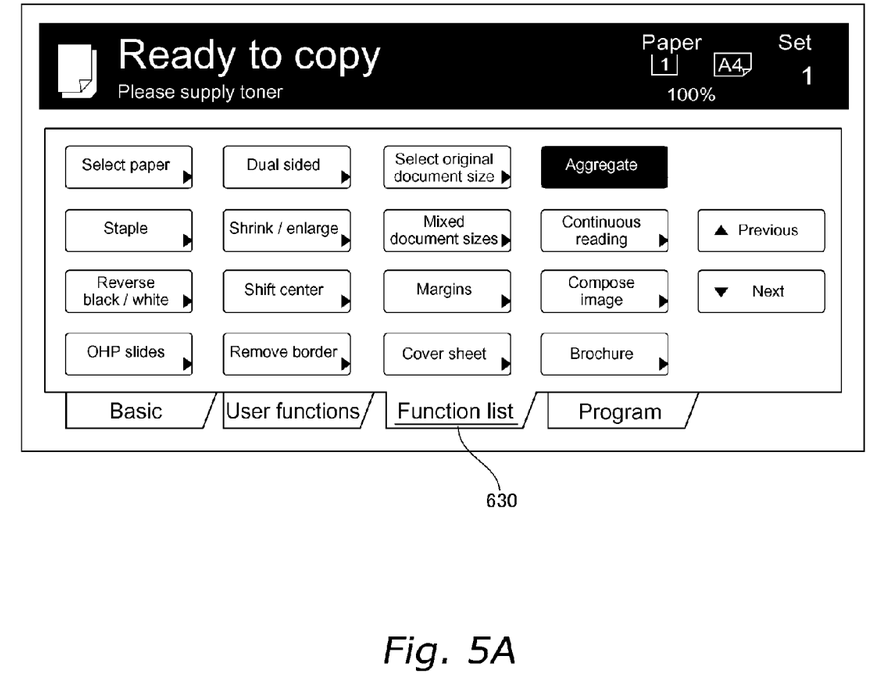
FIGS. 5A-5D are explanatory diagrams of the operating unit.
Figure 5B:
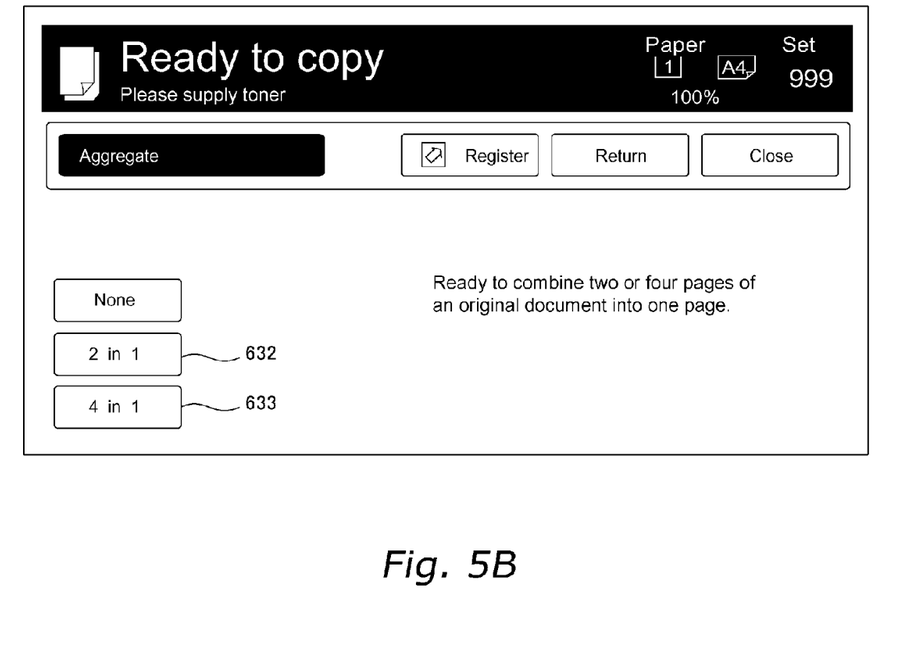
Figure 5C:
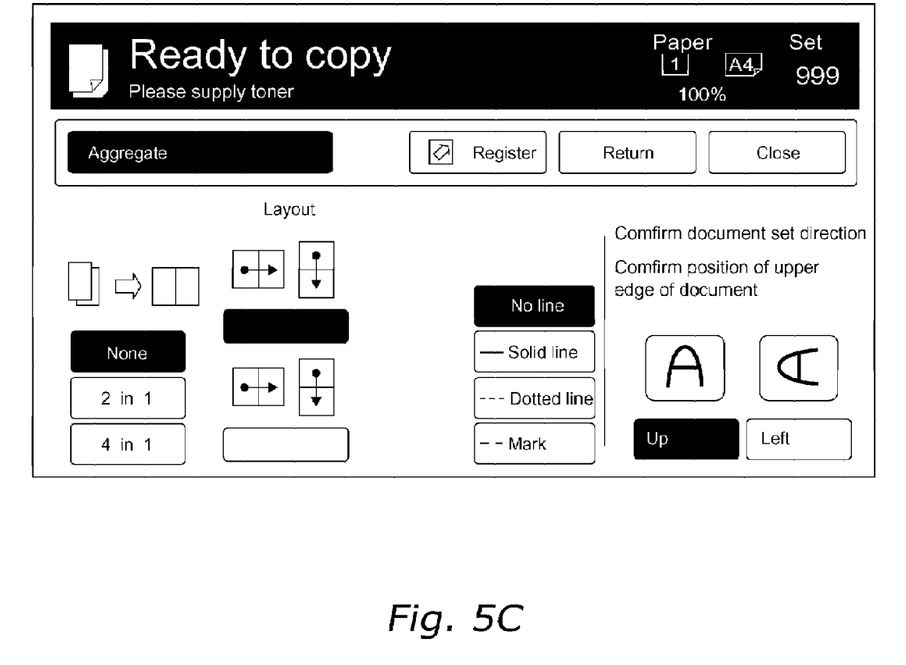
Figure 5D:
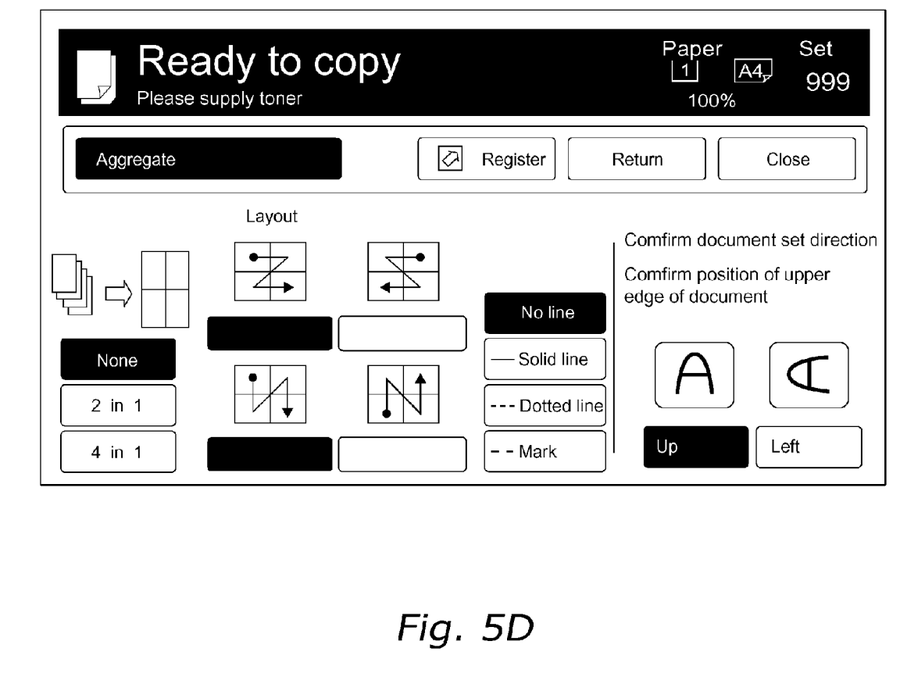

The touch panel display will be as shown in FIG. 5A through FIG. 5D when the aggregate copy mode selecting key 631 is selected from the function list tab 630. As shown in FIG. 5A, the function list tab 630 has multiple function selecting keys such as for a black and white inverse function, double sided printing, and an aggregate copy function. As shown in FIG. 5B, when the aggregate copy mode selecting key 631 is selected, the aggregate copy setting screen will be displayed with an N in 1 copy mode for aggregate copying of N ($\geqq$2) sheets of original document images onto a single sheet of copy paper. When the 2 in 1 mode selecting key 632 is selected for aggregate copying 2 sheets of images onto a single sheet of copy paper, the display will be as shown in FIG. 5C, and when the 4 in 1 mode selecting key 633 is selected for aggregate copying 4 sheets of images onto a single copy paper, the display will be as shown in FIG. 5D. By selecting the various N in 1 modes, the layout of the image to be copied and the direction of the original document setting or the like can be set.

Figure 6A:
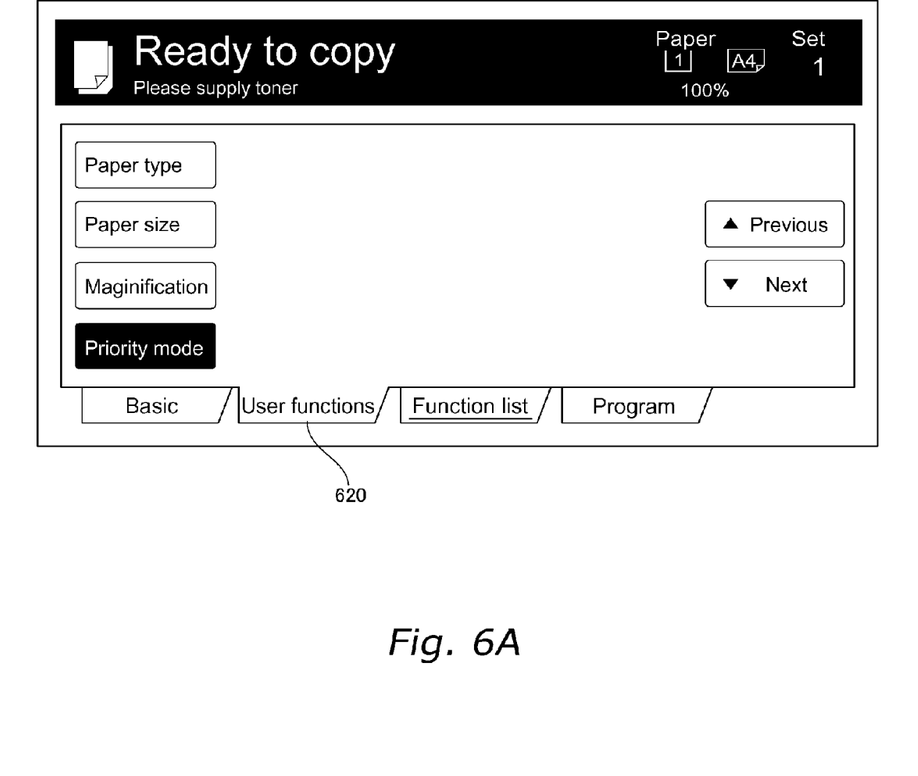
FIGS. 6A-6B are explanatory diagrams of the operating unit.
Figure 6B:
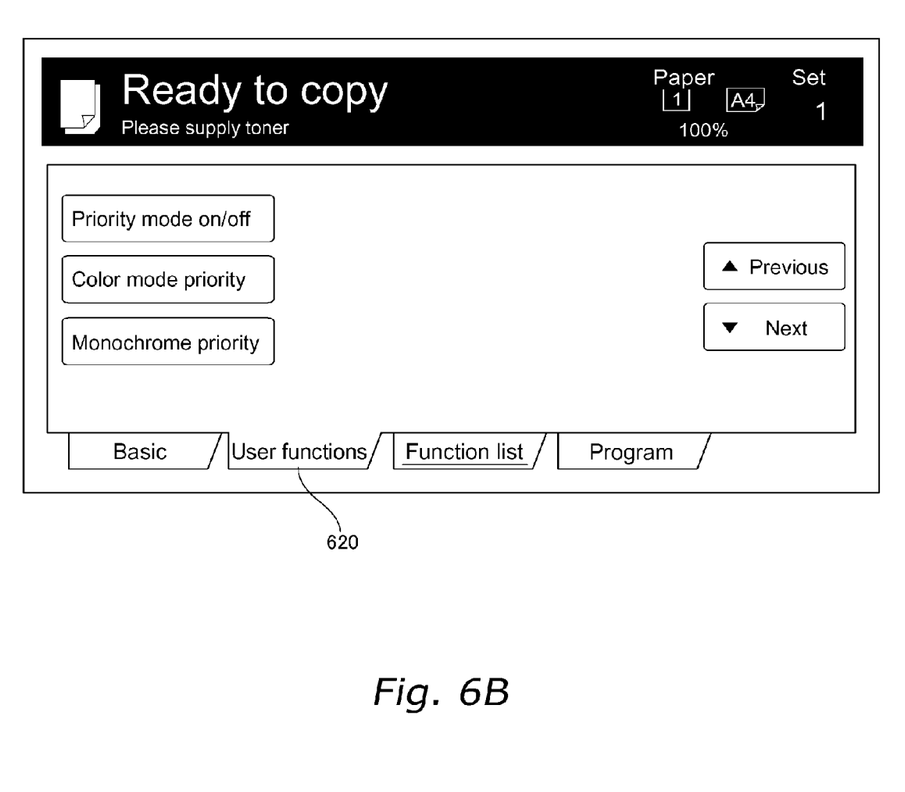

As shown in FIG. 6A and FIG. 6B, the user function tab 620 can independently set detailed data for the various function selecting keys which are established in the basic mode setting tab 610. When the priority mode setting key is selected as shown in FIG. 6A, the previously set mode can be confirmed or modes can be set such as a color mode priority or a monochrome mode priority or the like as shown in FIG. 6B.

Figure 7:
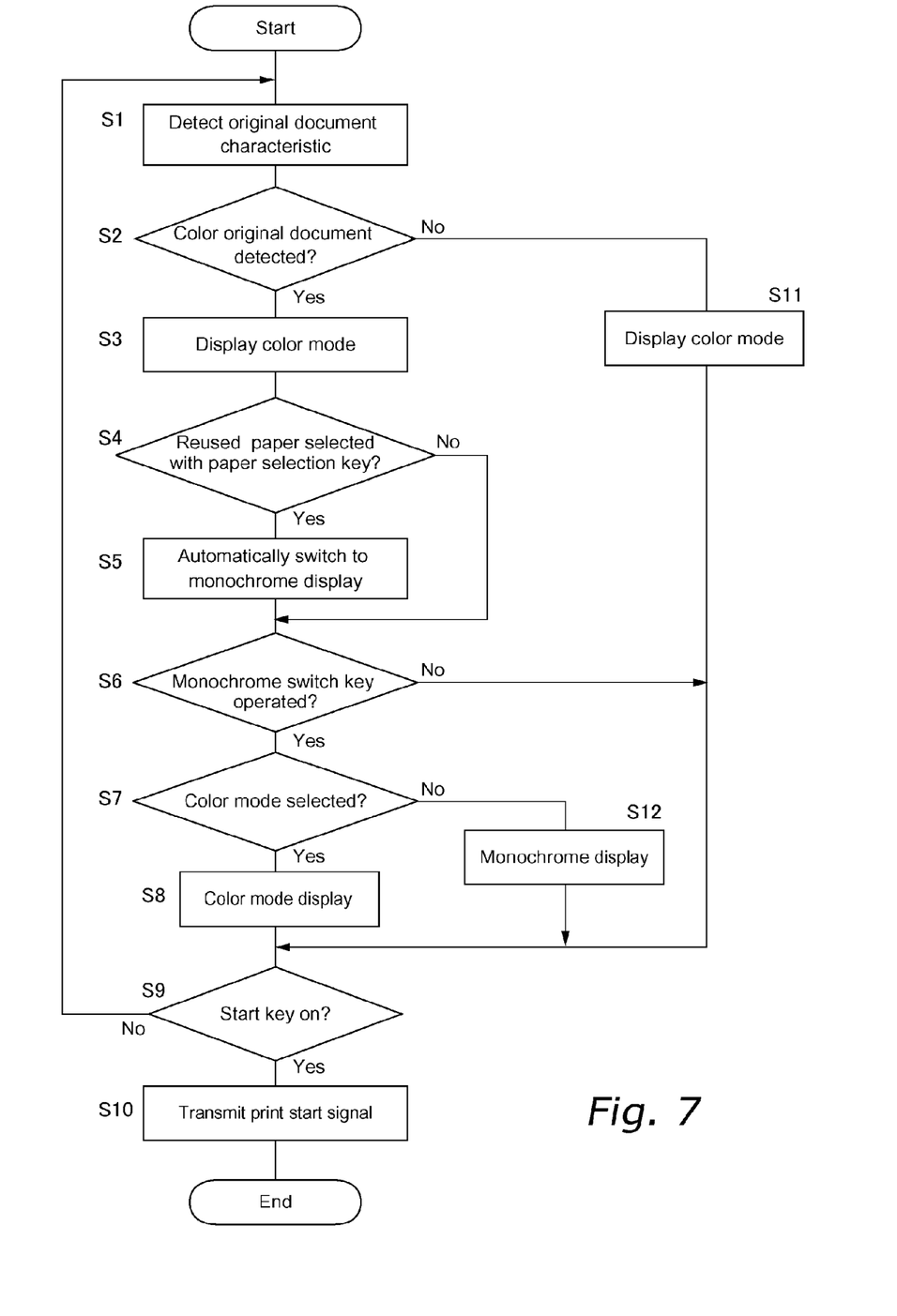
FIG. 7 is a flowchart showing the color/monochrome switching process.

The operation of the CPU using the operating display unit 6 will be described using FIG. 7. First, the original document attributes which determine whether the original document to be copied is a color image or monochrome image are detected using the operation of the original document selecting key 611 (S1) and the function of the automatic mode switching means will automatically switch the settings based on the detected original document attributes, such that if the image is a color image, the color mode will be selected, and if the image is monochrome, the output will be performed in monochrome mode. When the original document is detected to be a color image (S2), the fact that the color mode is to be executed will be displayed (S3), and if the original document is detected to be a monochrome image, the fact that the monochrome mode is to be executed will be displayed (S11).

Next, a determination will be made as to whether or not reused paper has been selected by operating the copy paper selecting key 613 which selects the size and type of the copy paper onto which the image is output (S4) and if reused paper is selected as the copy paper onto which the image is output, the mode switched to by the automatic mode switching means will be given priority and the settings for copying will be switched to the monochrome mode and that fact will be displayed (S5).

The mode can be switched to the color mode by the automatic mode switching means or the mode setting which is set at this stage can be forcibly changed by operating the mode switching key 612 which functions as the manual mode switching means which can manually change the setting back to the color mode or to the monochrome mode. The CPU determines whether or not the mode switching key 612 has been operated, and if the key has been operated, will switch the mode to the color mode (S7) and will display the fact that the color mode has been executed (S8).

After the image output mode has been set, pressing down on the start key 62 (S9) will transmit a print start signal to the CPU 91 (S10), and a printing command will be sent from the CPU to the copy processing units, and copying will begin.

In step S4, a situation in which reused paper was selected by operating the copy paper selecting key 613 will be used to describe the priority mode switching means, but the 2 in 1 mode selecting key 631 and the 4 in 1 mode selecting key 632 of the aggregate copying mode may similarly function as the priority mode switching means, and forcibly switch the mode to monochrome mode as shown in FIG. 5A through FIG. 5D.

Another embodiment will be described below. In the aforementioned embodiment, the case where image output to reused paper was selected by operating the copy paper selecting key 613 as the priority mode switching means, which gives priority to the mode switched to by the automatic mode switching means and forcibly switches to monochrome mode, and the case where aggregate copying was selected from the function list tab 630, have been described, but the present invention is not restricted to these embodiments, and a construction which uses other function keys is also acceptable. For instance, the paper feed port selecting key which selects a specific paper feed port or the zoom key or the like for reducing printing below a certain level may also be used as the priority mode switching means.

A construction has been described for detecting whether the original document to be copied is a color image or monochrome image by operating the original document selecting key 611 as the original document attribute detection means, but alternately, a construction is also possible in which an image which has been read by an image scanning unit using a CCD as the original document attribute detection means is automatically identified as to whether the image thereon is a color image or a monochrome image.

Any terms of degree used herein, such as "substantially", "about" and "approximately", mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2004-326486. The entire disclosure of Japanese Patent Application No. 2004-326486 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. An image forming device comprising:
   original document attribute detection means which detects whether an original document to be copied is color or monochrome;
   automatic mode switching means which automatically switches between a color mode which forms a color image, and a monochrome mode which forms a monochrome image, based on the original document attribute detected by the original document attribute detection means;
   image forming means which copies an original document image to recording paper using the mode switched to by the automatic mode switching means; and
   priority mode switching means which gives priority to the switching by the automatic mode switching means in order to forcibly switch to monochrome mode.

2. The image forming device according to claim 1, further comprising a priority mode switch setting means which is preset to accept or reject forcible switching by the priority mode switching means.

3. The image forming device according to claim 1, further comprising a manual mode switching means which manually selects either the color mode or the monochrome mode regardless of the mode set by the automatic mode switching means or the priority mode switching means.

4. The image forming device according to claim 1, wherein the priority mode switching means comprises a reused paper selection means or an aggregate copy mode selection means.

* * * * *